United States Patent [19]

Steele

[11] 3,975,106
[45] Aug. 17, 1976

[54] BUILDERS SCAFFOLDING

[75] Inventor: Raymond Ernest Steele, Kenilworth, England

[73] Assignee: Kwikform Limited, Birmingham, England

[22] Filed: May 8, 1975

[21] Appl. No.: 575,675

[30] Foreign Application Priority Data

May 8, 1974 United Kingdom............... 20191/74

[52] U.S. Cl. ..................................... 403/374
[51] Int. Cl.² ........................................... F16B 7/04
[58] Field of Search ............. 182/178, 179; 403/13, 403/14, 49, 256, 375, 242, 345, 332, 380, 374; 151/54, 57, 58; 52/638

[56] References Cited
UNITED STATES PATENTS

| 479,706 | 7/1892 | Dexter | 403/380 |
| 3,420,557 | 1/1969 | Francis | 182/179 |

Primary Examiner—Reinaldo P. Machado
Attorney, Agent, or Firm—A. Yates Dowell, Jr.

[57] ABSTRACT

In builders scaffolding of the kind in which cross members are connected to upright members by means of a wedge clamping member extending through apertures in opposed limbs of a C section bracket which is arranged to embrace a socket member secured to the upright member, whereby the wedge clamping member extends through the socket member and urges the limbs of the bracket into pressure engagement with the upright member, the upper limb of the bracket is formed with a depression adapted to enter the open upper end of the socket, whereby the bracket can be made more easily and cheaply than in the previous arrangement in which the upper limb was provided with external dependent lips to engage the outside of the socket member.

5 Claims, 5 Drawing Figures

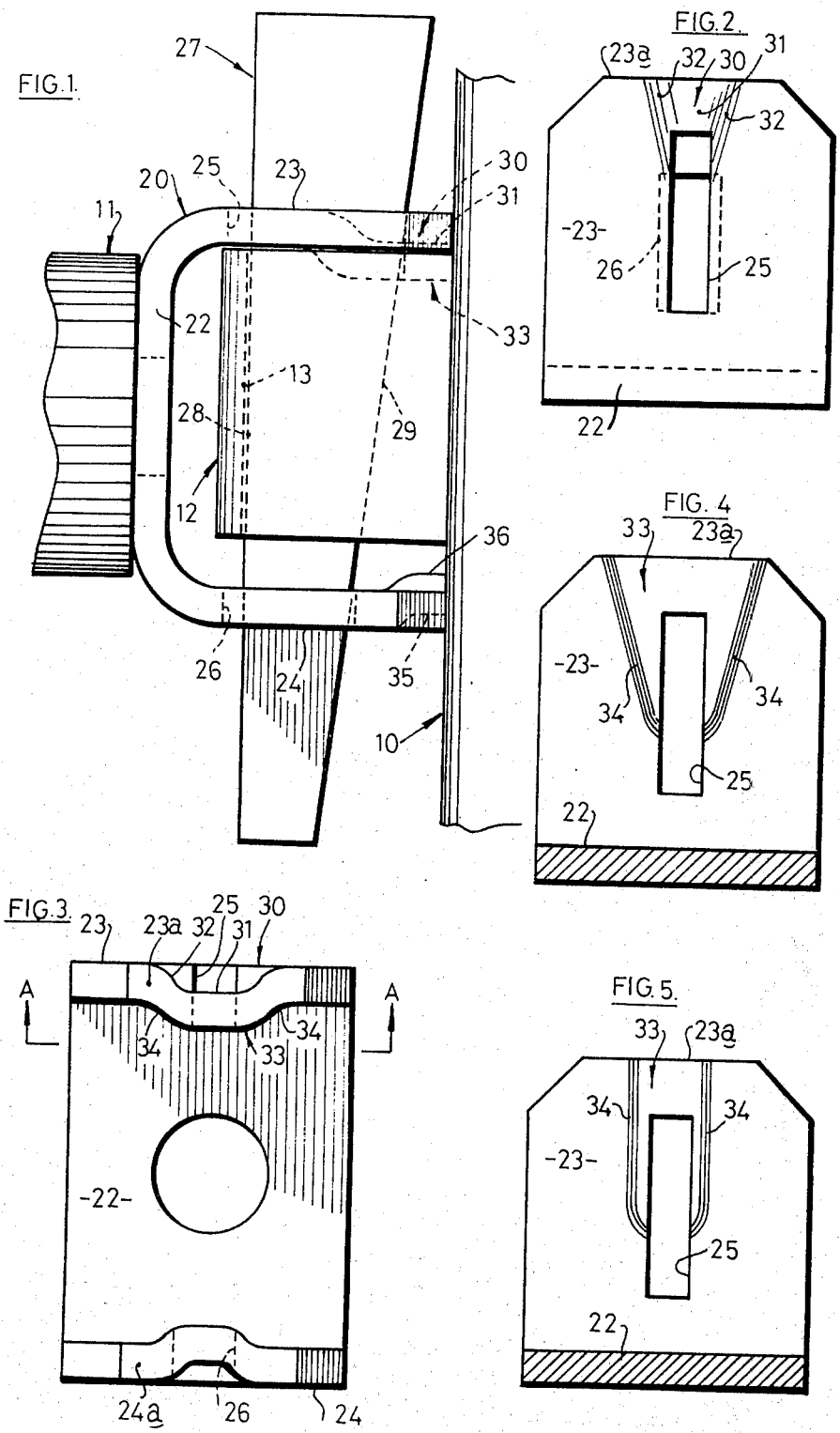

BUILDERS SCAFFOLDING

This invention relates to builders scaffolding of the kind, herein called the kind specified, which comprises an upright member, a cross member and connecting means for detachably connecting the upright member and cross member together.

The term "cross member" as used herein includes a ledger which in use extends horizontally substantially parallel to the length of a wall or other structure adjacent the scaffolding, a transom which also extends horizontally but transverse to the ledger and, any other member of the scaffolding which in use extends transversely to the upright member either perpendiculaltly or at an inclination thereto and which is adapted to be connected to or, to connect together upright members of the scaffolding, for example, a diagonal bracing element, a stage bracket, a toe board, or a platform guard rail.

In our prior U.S. Pat. No. 3,420,557 we have described builders scaffolding of the kind specified, wherein the connecting means comprises a socket mounted on the exterior of the upright member, the socket being open at each of its two opposite ends which are spaced apart along the length of the upright member, the connecting means further comprising connector means provided at or near one end of the cross member and including two limbs which in the operative position are spaced apart vertically to permit of the upright member socket being received therebetween, each limb having an abutment face adapted to abut agains the upright member, each limb further being provided with an opening which receives a wedge clamping member forming part of the connecting means, the arrangement being such that in connecting the cross member to the upright member the two limbs of the connector means are disposed vertically spaced apart and straddle the socket with the wedge clamping member extending through the two open ends of the socket in pressure engagement with an edge of the opening of each of the two limbs which is nearest to the upright member and also with an internal clamping face of the socket, in such a manner that said abutment faces of the two limbs are brought into pressure engagement with the upright member at positions above and below the socket.

In a specifically illustrated embodiment the limb of the connector means which is uppermost in relation to the socket when connected thereto is provided with two dependent lips each extending transversely to the abutment face of the uppermost limb, the lips having their inner faces spaced relatively apart by a distance greater than the maximum width of the socket so as to permit of said lips overlapping with the exterior of the socket, and the distance between the lower edges of each dependent lip and the lower limb being greater than the vertical depth of the socket.

Whilst the provision of such lips is particularly beneficial for the reasons set out in such prior specification, it is not entirely without difficulties. In particular, where the connector means comprises a channel section pressing attached at the end of the cross member the lips on the upper limb thereof must be bent against the grain of the metal (usually steel) and cracking of the pressing is a problem unless a suitably high grade steel is employed. The appropriate grade of steel is unfortunately expensive and not always readily available.

According to the present invention the upper limb of such connector means which affords spaced generally parallel limbs, is formed with a depression affording at the underside of the upper limb a pair of oppositely directed guide faces each extending transversely to the abutment face of the upper limb, the guide faces being spaced relatively apart by a distance less than the maximum internal width of the socket so as to permit of said faces overlapping with the interior face of the socket, and the distance between the underside of the depression and the upper face of the lower limb being greater than the vertical depth of the socket so as to enable the depression to be received within the upper end of the socket.

Preferably, the depression extends fully up to the abutment face of the upper limb and the guide faces extend substantially prallel to the corresponding sides of the socket against which they are located. For example, the guide faces may diverge at an angle of approximately 30° in a direction towards the abutment face in a case where the socket is in the form of a pressing of generally V-section. Alternatively, where the socket is in the form of a U-section pressing with largely parallel limbs, the guide faces may be substantially parallel to one another.

Conveniently, the width of the bottom of the depression in the upper face of the upper limb is substantially equal to the width of the opening receiving the wedge clamping member, and the guide faces extend from a position intermediate the ends of such opening.

Forming a depression affording such guide faces, which serve the same function as the previously mentioned lips, involves lelss difficulties than forming such lips, and in particular enables the channel section pressing or the like to be formed of steel having a significantly relaxed specification which is accordingly less expensive and generally easier to obtain, and indeed a wide range of commercially available mild steels can be used for this purpose as compared with a much more restricted range of commerically available steels suitable for use for the preferred embodiment as described in our prior patent previously referred to.

Moreover, there can also be a saving of material in that the depression is formed by deformation of an integral portion of the limb and does not require any lateral extension of the limb beyond its normal width and as is the case where lips are provided as previously described.

The invention further comprises for use in the construction of builders scaffolding a cross member comprising an elongated body at or near one end of which is provided connector means including two spaced apart limbs with each limb having an abutment face adapted to engage with an upright member forming part of the builders scafffolding, each limb having a slot, and a wedge clamping member adapted to extend through both of the slots in a position to engage with an internal clamping face of a socket on the upright member wherein that limb which in use is intended to be uppermost is formed with a depression affording at the underside of the limb a pair of oppositely directed guide faces each extending transversely to the abutment face of the limb so as to enable the depression to be received within the upper end of a socket on an upright member.

A preferred embodiment of the invention will now be described with reference to the accompanying drawings which apart from FIG. 1 show only the connector means which is intended to be secured at the end of a cross member to afford the aforesaid limbs. In the accompanying drawings:

FIG. 1 shows in side elevation a connection between an upright scaffold member and a horizontal member, FIGS. 2 and 3 are respectively plan and end views of the connector means, FIG. 4 is a section on the line A—A of FIG. 3 showing an underside plan view of the upper limb of the connector means, and FIG. 5 is a view, similar to that of FIG. 4, of a modified embodiment.

FIG. 1 of the accompanying drawings shows an upright scaffold member 10 provided with sockets, one of which is shown at 12, each formed by bending a flat metal strip to form a wide V the ends of which are welded to the exterior of the upright, more particularly as shown in FIG. 2 of our previously mentioned prior specification.

The connector means 20 in accordance with the present invention is again a pressing of channel section with a web 22 and upper and lower limbs 23 and 24.

The upper limb 23 is formed with an opening in the form of a slot 25 and the lower limb 24 is formed with another opening also in the form of a slot 26, the two slots being of dimensions suitable for receiving an associated wedge clamping member indicated at 27. The length and disposition of each of the slots 25 and 26 in their respective limbs 23, 24, is selected in accordance with the angle between the wedging faces 28 and 29 of the wedge member 27 and the disposition of abutment faces 23a, 24a (see FIGS. 2 to 4) constituted by the free ends of the limbs, in relation to the internal clamping faces 13 of the associated socket 12 when the connector means 20 is in use to secure a cross member 11 to which it is attached to the upright member 10 is an assembly of builders scaffolding of the kind specified.

In accordance with the present invention, the upper limb 23 is formed with a depression indicated generally at 30. The depression 30 is of generally elongated form and extends parallel to the length of the upper limb 23 from the slot 25 fully up to the abutment face 23a. The width of the bottom 31 of the depression is approximately equal to the width of the slot 25, but the side walls 32 thereof are inclined outwardly towards the abutment face 23a and also upwardly.

The depression 30 gives rise to a complementary downward protrusion 33 at the underside of the upper limb 23. The lateral edges of the protrusion 33 afford guide faces 34 (FIGS. 3 and 4) which are complementary to the side walls 32 of the depression 30 and are likewise inclined upwardly and outwardly. As can be seen most clearly from FIG. 4, the guide faces 34 diverge relative to one another from a position intermediate the ends of the slot 25 towards, and up to, the abutment face 23a.

In the embodiment illustrated, the guide faces 34 diverge at an angle of 30° in conformity with the lateral limbs of the metal strip defining the socket 12. However, in an alternative embodiment shown in FIG. 5, they are made parallel to one another so that the pressing is then suitable for use as a connector means for use with a socket defined by a U-section pressing of which the limbs are substantially parallel to one another.

The vertical spacing between the protrusion 33 and the upper face of the lower limb 24 is made somewhat greater than the vertical height of the corresponding socket 12 with which the pressing is to co-operate so that the pressing may be offered laterally up to the socket. The protrusion 33 may then enter the open upper end of the socket so that the guide faces 34 co-operate with the corresponding internal faces of the socket to locate the pressing relative to the socket.

As can be seen, the lower limb 24 is formed with a depression 35 in its lower face and a complementary protrusion 36 in its upper face. This is because the connector means 20 is formed from metal strip which is punched to form depressions at intervals corresponding to the length of the pressing as measured from the free end of one limb, around the web, and to the other free end of the other limb. The strip is then divided into individual pieces by severing along lines extending through the depressions. Thus the depression 35 in the lower limb 24 was formed initially as an extension of the depression 30 in the upper limb 23 of the adjacent connector member 20 formed from the strip stock.

It will be appreciated that whilst the invention has been described as applied to connector means comprising a C-section pressing formed by bending steel strip to form a part for attachment to a cross member of the scaffold structure, it will also be appreciated, that the present invention may be utilised in an arrangement where the upper and lower limbs are formed integrally with the cross member.

I claim:

1. In builders scaffolding comprising
  a. upright members,
  b. cross members, and
  c. connecting means for detachably connecting said cross members to said upright members, each such means comprising
  d. a socket mounted on the exterior of said upright member, the socket being open at each of its two opposed ends which are spaced apart along the length of the upright member,
  e. a connector member provided at or near one end of said cross member and including two limbs which in the operative position are spaced apart vertically to permit of the upright member socket being received therebetween, each limb having an abutment face adapted to abut against the upright member, each limb further being provided with an opening,
  f. a wedge clamping member received in said openings and extending through said socket whereby in connecting the cross member to the upright member the two limbs of the connector means are disposed vertically spaced apart and straddle the socket with the wedge clamping member extending through the two open ends of the socket in pressure engagement with an edge of the opening of each of the two limbs which is nearest to the upright member and also with an internal clamping face of the socket in such a manner that said abutment faces of the two limbs are brought into pressure engagement with the upright member at positions above and below the socket,
  the improvement wherein
  g. the upper limb of each such connector member is formed with a depression extending fully up to the abutment face of the upper limb and affording at the under side of the upper limb a pair of oppositely directed guide faces each extending transversely to the abutment face of the upper limb, the guide faces being spaced relatively apart by a distance less than the maximum internal width of the socket and extending substantially parallel to the corresponding side of the socket so as to permit of said faces overlapping with the interior face of the socket against which they are located, and h. the distance between the underside of the depression and the upper face of the lower limb is greater than the vertical depth of the socket so as to enable the depression to be received within the upper end of the socket.

2. Builders scaffolding as claimed in claim 1 wherein the guide faces diverge at an angle of approximately 30° in a direction towards the abutment face so as to be adapted to co-operate with a socket of generally V-shape in horizontal section.

3. Builders scaffolding as claimed in claim 1 wherein the guide faces extend substantially parallel to one another so as to be adapted to co-operate with a socket of generally U-shape in horizontal section.

4. Builders scaffolding as claimed in claim 1 wherein the width of the bottom of the depression in the upper face of the upper limb is substantially equal to the width of the opening receiving the wedge clamping member, and the guide faces extend from a position intermediate the ends of such opening.

5. A cross member for use in the construction of builders scaffolding which includes upright members having hollow socket members thereon, comprising an elongated body having a connector member adjacent at least one end thereof, said connector member including upper and lower vertically spaced limbs, said upper limb having an abutment face adapted to engage one of the upright members forming part of the builders scaffolding, each of said limbs having a slot therethrough, and said upper limb having a depression therein which extends from said abutment face thereof, said depression affording at the underside of said upper limb a pair of oppositely directed guide faces each extending transversely to said abutment face thereof whereby the depression in said upper limb may be received within the upper end of a socket on an upright member of the scaffolding.

* * * * *